United States Patent
Lee

(10) Patent No.: US 9,656,193 B2
(45) Date of Patent: May 23, 2017

(54) COMPOUND WATER FILTERING JUG

(71) Applicant: Shen Hung Enterprise Co., Ltd., Taoyuan County (TW)

(72) Inventor: Tsung-Hui Lee, Taoyuan (TW)

(73) Assignee: SHEN HUNG ENTERPRISE CO., LTD., Taoyuan County (TW)

( * ) Notice: Subject to any disclaimer, the term of this patent is extended or adjusted under 35 U.S.C. 154(b) by 235 days.

(21) Appl. No.: 14/595,231

(22) Filed: Jan. 13, 2015

(65) Prior Publication Data

US 2016/0200590 A1   Jul. 14, 2016

(51) Int. Cl.
*C02F 1/00* (2006.01)
*B01D 29/56* (2006.01)
*C02F 1/28* (2006.01)

(52) U.S. Cl.
CPC .............. *B01D 29/56* (2013.01); *C02F 1/003* (2013.01); *C02F 1/281* (2013.01); *C02F 1/283* (2013.01); *C02F 1/286* (2013.01); *C02F 2307/04* (2013.01)

(58) Field of Classification Search
CPC .. C02F 1/002; C02F 2103/02; C02F 2307/04; B01D 29/56

USPC ....... 210/464–470, 473, 474, 476, 477, 484, 210/488, 492, 335, 513, 489, 336, 337, 210/338, 342, 283, 284, 290
See application file for complete search history.

(56) References Cited

U.S. PATENT DOCUMENTS

| 7,396,461 B2 * | 7/2008 | Bommi | C02F 1/003 210/266 |
| 2008/0035552 A1 * | 2/2008 | Lee | C02F 1/003 210/335 |
| 2009/0084726 A1 * | 4/2009 | Lee | B01D 39/06 210/486 |

\* cited by examiner

*Primary Examiner* — Madeline Gonzalez
(74) *Attorney, Agent, or Firm* — Leong C. Lei

(57) ABSTRACT

A compound water filtering jug includes a jug, a filtering container, an upper filter, and a lower filter. The filtering container is arranged in an upper portion of the jug. The upper filter is arranged in the filtering container and the upper filter receives therein a plurality of filtering materials. The lower filter is arranged outside the filtering container and is located in the jug. The lower filter receives therein a plurality of filtering materials. The upper filter is coupled to and in communication with the lower filter. As such, when a liquid (such as water) is poured into the filtering container, the liquid is subjected to a first stage of filtering by the upper filter and then flows into the lower filter so that the liquid can be subjected to a second stage of filtering by the lower filter.

4 Claims, 6 Drawing Sheets

COMPOUND WATER FILTERING JUG

TECHNICAL FIELD OF THE INVENTION

The present invention generally relates to a compound water filtering jug, and more particularly to a water filtering jug that comprises upper and lower layers of filter for conducting multiple stages of liquid filtering.

DESCRIPTION OF THE PRIOR ART

Most of the household tap water contains impurities, such as tiny sands, bacteria, algae, and heavy metals. Constantly drinking such tap water for a long term without proper treatment or filtering of the tap water would cause detrimental influence on human body health. Most families use a complete set of filtering facility to conduct filtering of tap water and professional people with skills are only needed for installation of such filtering facility. The facility so installed is generally hard to move due to the fixed installation and piping connection, making it only usable for the specific household. The filtering facility is expensive and timely replacement of filter cores is very tedious and time consuming. These are some of the shortcomings of the known filtering facility.

In addition, water filtering flasks are also available in the market and they use a single filter to purify water. This leads to various drawbacks including being not so effective in removing impurity and microorganisms contained in water.

SUMMARY OF THE INVENTION

The primary object of the present invention is to provide a compound water filtering jug, which comprises a jug, a filtering container, an upper filter, and a lower filter. The filtering container is arranged in an upper portion of the jug. The upper filter is arranged in the filtering container and the upper filter receives therein a plurality of filtering materials. The lower filter is arranged outside the filtering container and is located in the jug. The lower filter receives therein a plurality of filtering materials. The upper filter is coupled to and in communication with the lower filter. As such, when a liquid (such as water) is poured into the filtering container, the liquid is subjected to a first stage of filtering by the upper filter and then flows into the lower filter so that the liquid can be subjected to a second stage of filtering by the lower filter. Also, a unique inner container is provided internally to receive and hold therein various materials, such as filtering materials including alkaline rock, metallic magnesium, and bio-ceramics, so as to allow such filtering material to dissolve and activate first and then flow into the jug, whereby multiple stages of liquid filtering can be achieved with the upper filter and the lower filter to more effectively remove the impurities and microorganisms contained in water and also to provide an effect of activation of water.

The foregoing objectives and summary provide only a brief introduction to the present invention. To fully appreciate these and other objects of the present invention as well as the invention itself, all of which will become apparent to those skilled in the art, the following detailed description of the invention and the claims should be read in conjunction with the accompanying drawings. Throughout the specification and drawings identical reference numerals refer to identical or similar parts.

Many other advantages and features of the present invention will become manifest to those versed in the art upon making reference to the detailed description and the accompanying sheets of drawings in which a preferred structural embodiment incorporating the principles of the present invention is shown by way of illustrative example.

DETAILED DESCRIPTION OF THE PREFERRED EMBODIMENTS

The following descriptions are exemplary embodiments only, and are not intended to limit the scope, applicability or configuration of the invention in any way. Rather, the following description provides a convenient illustration for implementing exemplary embodiments of the invention. Various changes to the described embodiments may be made in the function and arrangement of the elements described without departing from the scope of the invention as set forth in the appended claims.

Figure 1:
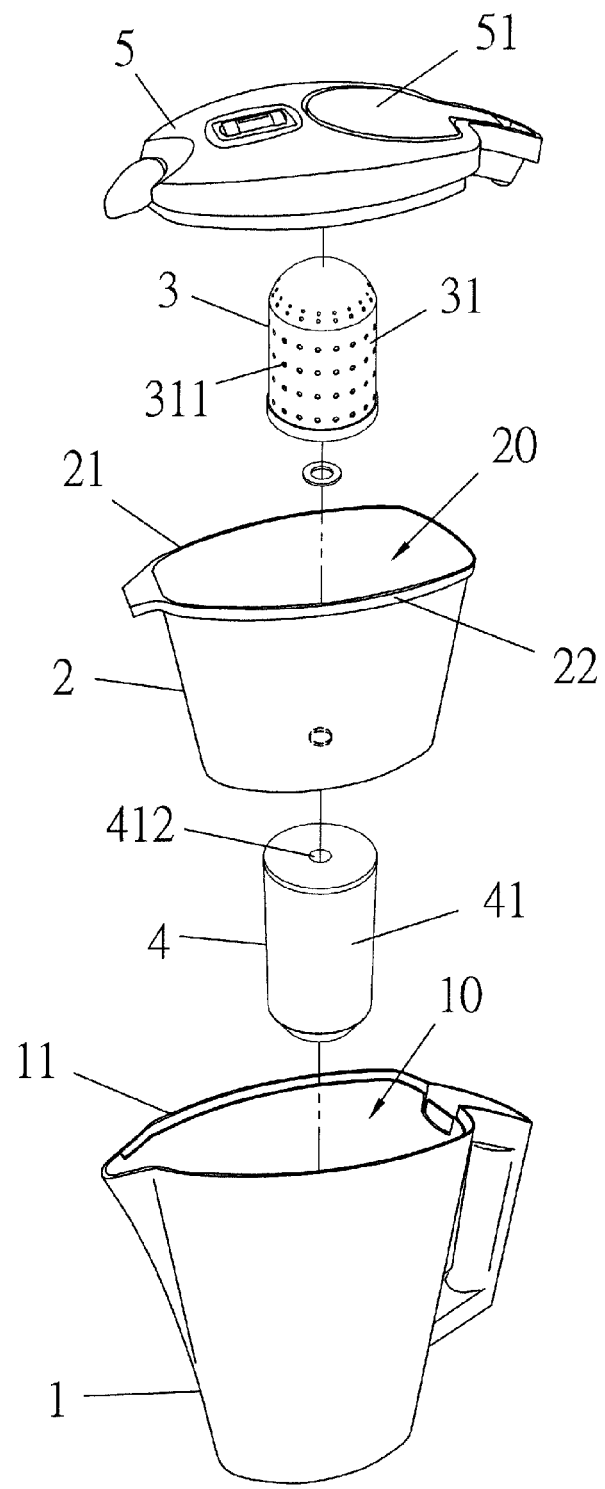
FIG. 1 is an exploded view showing a compound water filtering jug according to the present invention.
Figure 2:
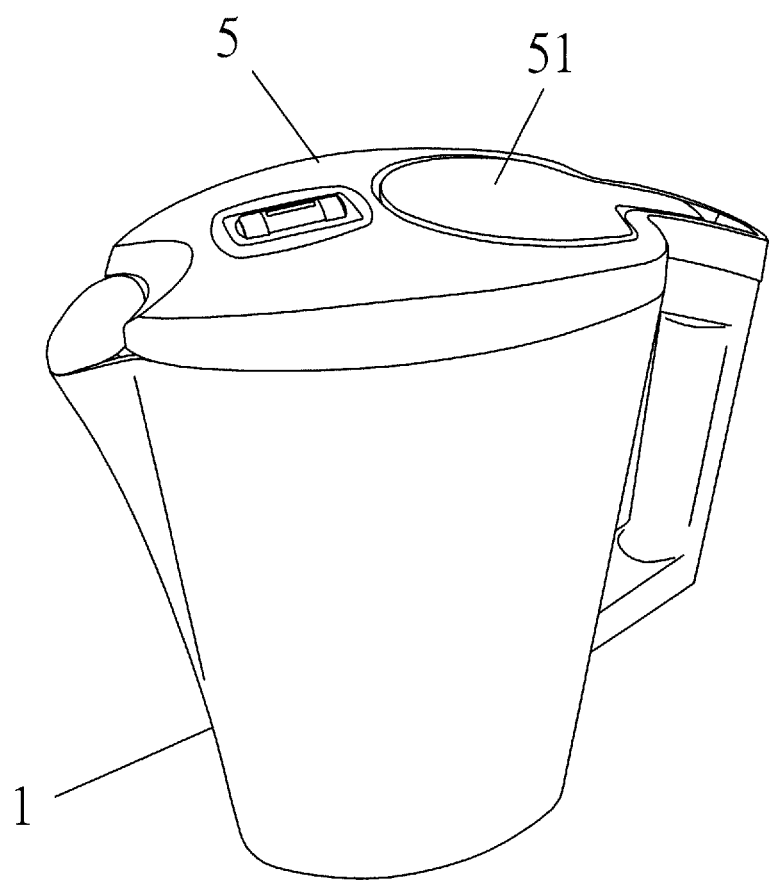
FIG. 2 is a perspective view showing the compound water filtering jug according to the present invention in an assembled form.
Figure 3:
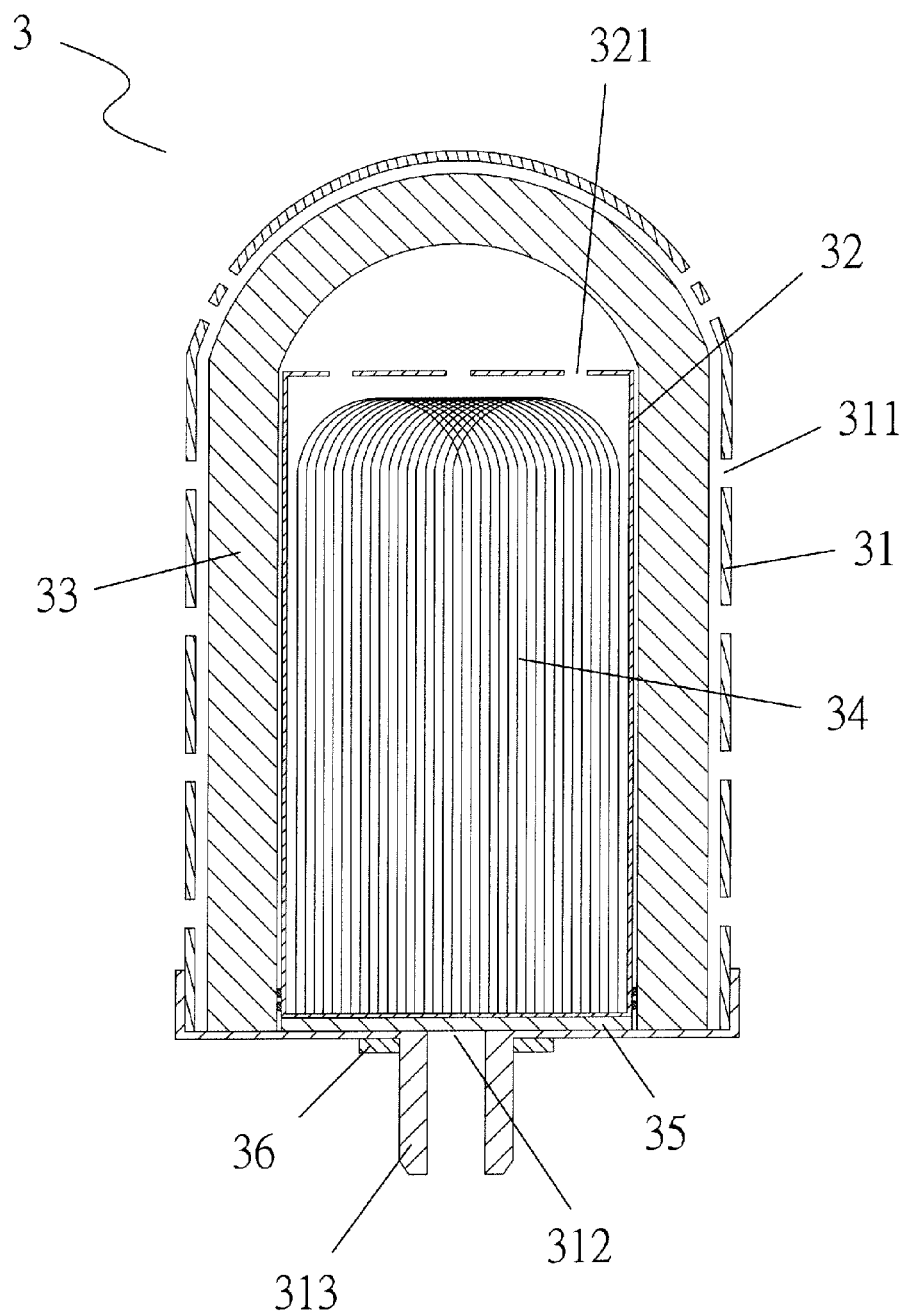
FIG. 3 is a cross-sectional view showing an upper filter of the compound water filtering jug according to the present invention.
Figure 4:
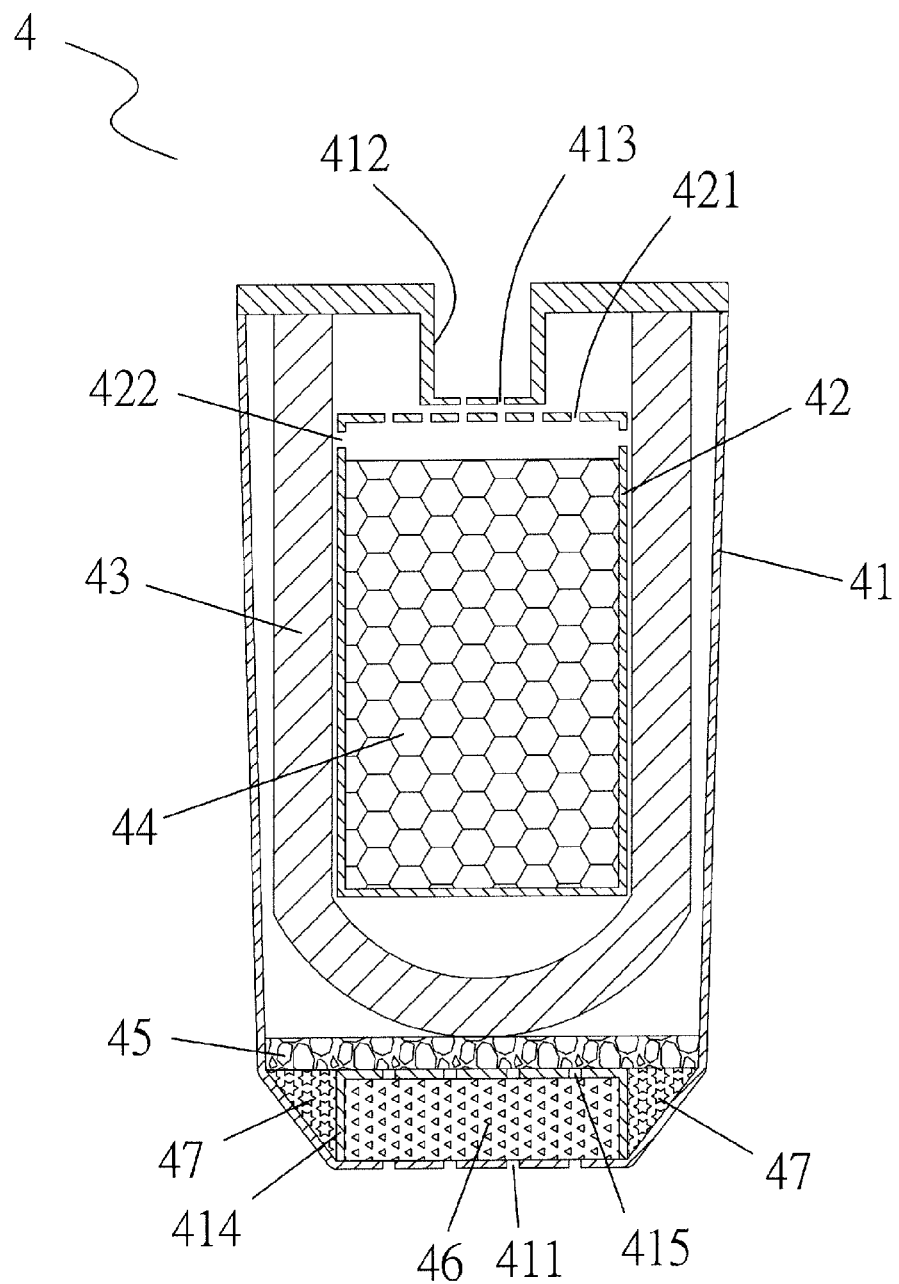
FIG. 4 is a cross-sectional view showing a lower filter of the compound water filtering jug according to the present invention.
Figure 5:
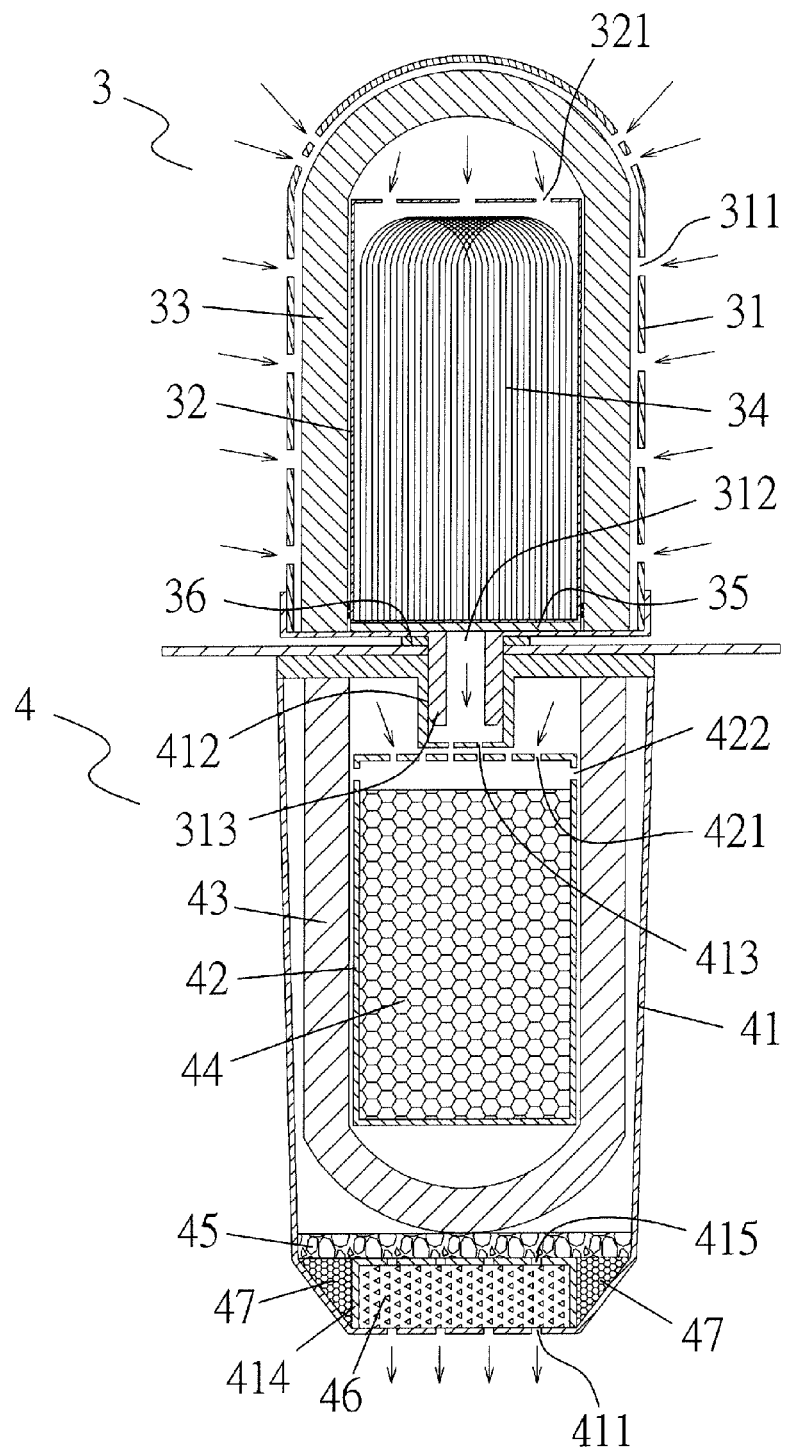
FIG. 5 is a cross-sectional view showing a combination of the upper filter and the lower filter of the compound water filtering jug according to the present invention.
Figure 6:
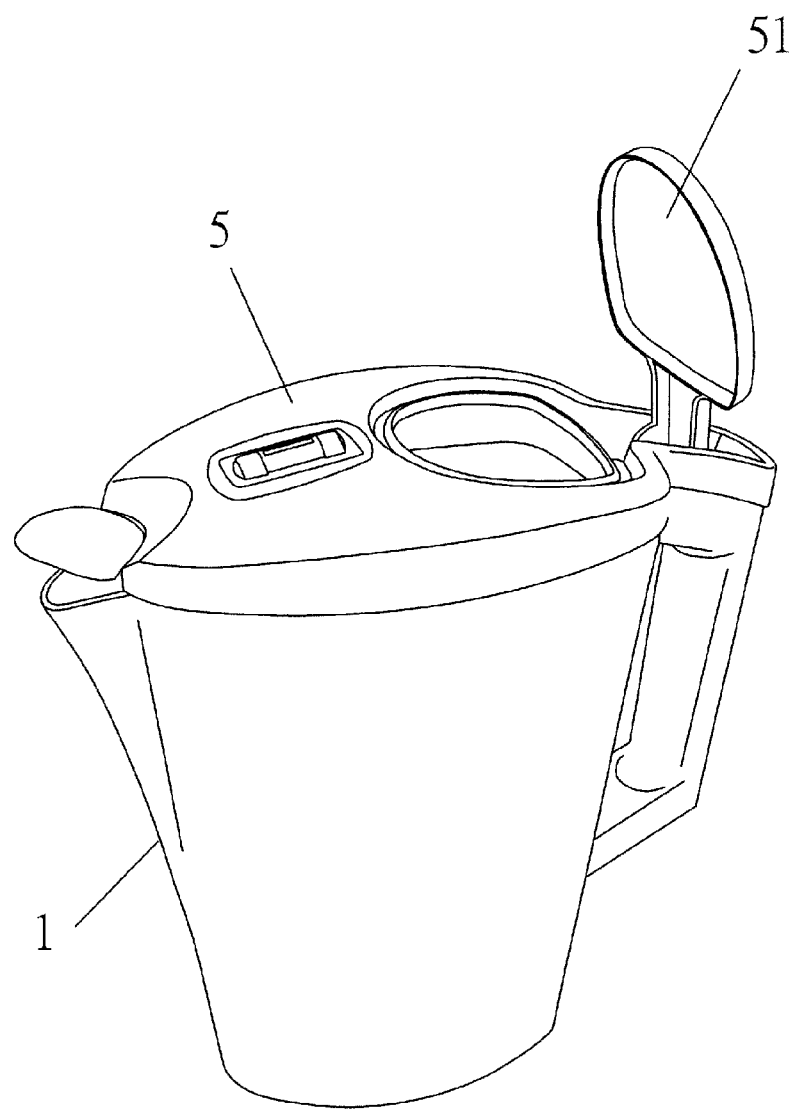
FIG. 6 is a perspective view illustrating an application of the completely assembled compound water filtering jug according the present invention.

Referring to FIGS. 1-6, the present invention provides a compound water filtering jug, which comprises a jug 1, a filtering container 2, an upper filter 3, and a lower filter 4.

The jug 1 comprises a first space 10 formed therein. The first space 10 has a first opening 11 formed at a location adjacent to a top of the jug 1.

The filtering container 2 is arranged in the first space 10 of the jug 1 and adjacent to the first opening 11 of the jug 1, so that the filtering container 2 is located in an upper portion of the jug 1. The filtering container 2 comprises a second space 20 formed therein. The second space 20 has a second opening 21 that is formed at a location adjacent to a top of the filtering container 2. The second opening 21 has a circumferential rim forming a coupling section 22 in such a way that the coupling section 22 is engageable with and thus mountable to a circumferential rim of the first opening 11 of the jug 1 so as to have the filtering container 2 fixable in the upper portion of the jug 1. The filtering container 2 has a bottom in which a first through hole 23 is formed.

The upper filter 3 is arranged in the second space 20 of the filtering container 2. The upper filter 3 comprises a first casing 31, a second casing 32, at least one first filtering material 33, at least one second filtering material 34, at least one third filtering material 35, and a sealing ring 36.

The first casing 31 comprises an outer wall in which a plurality of second through holes 311 is formed and a bottom in which a third through hole 312 is formed. The first casing 31 comprises a first connection section 313 that circumferentially extends along a circumference of the third through hole 312 so that the first connection section 313 is in communication with the third through hole 312. The first connection section 313 is arranged to insert through the first through hole 23 of the filtering container 2.

The second casing 32 is received in an interior space of the first casing 31. The second casing 32 has an outer wall in which a plurality of fourth through holes 321 is formed.

The first filtering material 33 is arranged between an inside surface of the first casing 31 and the second casing 32 in such a way that the first filtering material 33 encloses the second casing 32. The first filtering material 33 can be a carbon block.

The second filtering material 34 is arranged in an interior space of the second casing 32 at a location corresponding to the third through hole 312.

The third filtering material 35 is arranged between an inside bottom surface of the first casing 31 and the second casing 32 and is set at a location corresponding to the third through hole 312. The third filtering material 35 can be a piece of nonwoven fabric.

The sealing ring 36 is fit over an outer circumference of the first connection section 313 of the first casing 31.

The lower filter 4 is coupled to and in communication with the upper filter 3 and is arranged outside and below a bottom of the filtering container 2 and is received in the first space 10 of the jug 1. The lower filter 4 comprises a third casing 41, a fifth casing 42, at least one four filtering material 43, at least one fifth filtering material 44, at least one sixth filtering material 45, at least one seventh filtering material 46, and at least one eighth filtering material 47.

The third casing 41 has a bottom in which a plurality of fifth through holes 411 is formed and a top that is recessed to form a second connection section 412 and comprises sixth through holes 413 formed in the second connection section 412. The second connection section 412 is connectable with the first connection section 313 of the upper filter 3 in such a way that the sixth through holes 413 of the lower filter 4 are in communication with the third through hole 312 of the upper filter 3. Further, the third casing 41 receives therein a fourth casing 414 arranged on an inside bottom surface thereof so that the fourth casing 414 has a bottom that communicates with the fifth through holes 411 and a top in which seventh through holes 415 are formed.

The fifth casing 42 is arranged in an interior space of the third casing 41. The fifth casing 42 has a top in which a plurality of eighth through holes 421 is formed and a side wall in which ninth through holes 422 are formed in such a way that the ninth through holes 422 are set at locations adjacent to the eighth through holes 421 and close to the top of the fifth casing 42.

The four filtering material 43 is arranged between an inside surface of the third casing 41 and the fifth casing 42 in such a way that the four filtering material 43 encloses the fifth casing 42. The four filtering material 43 can be a carbon block.

The fifth filtering material 44 is arranged in an interior space of the fifth casing 42. The fifth filtering material 44 can be a mixture of metallic magnesium, alkaline rock, and bio-ceramics.

The sixth filtering material 45 is arranged in the interior space of the third casing 41 and is located above the fourth casing 414 and the sixth filtering material 45 is set at a location below the four filtering material 43. The sixth filtering material 45 can be a cotton material.

The seventh filtering material 46 is arranged in an interior space of the fourth casing 414. The seventh filtering material 46 can be bio-ceramics.

The eighth filtering material 47 is arranged in the interior space of the third casing 41 and is received in a space between the sixth filtering material 45 and the fourth casing 414. The eighth filtering material 47 can be metallic magnesium.

The filtering container 2 is set at a location corresponding to the first opening 11 of the jug 1 so that the filtering container 2 is located in the upper portion of the jug 1. The upper filter 3 is received in the second space 20 of the filtering container 2 and the first connection section 313 of the upper filter 3 extends through the first through hole 23 of the filtering container 2. The lower filter 4 is located outside and below the bottom of the filtering container 2 and the second connection section 412 of the lower filter 4 is coupled to and in communication with the first connection section 313 of the upper filter 3. The first connection section 313 and the second connection section 412 can be connected through locking or tight fitting. The sealing ring 36 that is fit over the outer circumference of the first connection section 313 helps prevent liquid contained in the filtering container 2 from leaking through the first through hole 23.

When a liquid (such as water) is poured into the filtering container 2, the liquid flows through the second through holes 311 of the upper filter 3 into the interior space of the upper filter 3, penetrating through the first filtering material 33 to reach the second casing 32 and flowing through the fourth through holes 321 to get into the interior space of the second casing 32, penetrating through the second filtering material 34 and the third filtering material 35 to reach the third through hole 312 to then drain out of the third through hole 312, whereby the liquid is subject to a first stage of filtering by means of the upper filter 3; afterwards, the liquid (such as water) flows through the third through hole 312 into the sixth through holes 413 of the lower filter 4, passing through the eighth through holes 421 to get into the interior space of the fifth casing 42, then penetrating through the fifth filtering material 44 and flowing out of the ninth through holes 422, then penetrating through the four filtering material 43 to enter the interior space of the third casing 41, where a portion of the liquid is filtered by the sixth filtering material 45 to flow through the seventh through holes 415 into the interior space of the fourth casing 414 and then penetrates through the seventh filtering material 46 to drain out of the fifth through holes 411, while another portion of the liquid is filtered by the sixth filtering material 45 to then penetrate through the eighth filtering material 47 to drain through the fifth through holes 411, whereby the liquid that has been subjected to filtering by the upper filter 3 and the lower filter 4 flows into the jug 1. As such, the upper filter 3 and the lower filter 4 are arranged to provide and achieve multiple stages of filtering of the liquid to thereby more effectively remove impurities and microorganisms contained in water and also to provide an effect of activation of water.

With liquid (such as water) flowing into the fifth casing 42, if no persistent supply of water is available for water filtering, then due to the ninth through holes 422 being arranged at high locations that are close to the top of the fifth casing 42, a portion of the liquid is trapped and remains in the fifth casing 42, so as to keep the fifth filtering material 44 that is contained in the fifth casing 42 soaked therein for an extended period of time, whereby the portion of liquid remaining in the fifth casing 42 may exhibit the property that the molecules thereof have enhanced activity. When the jug 1 is inclined for pouring out water, the portion of liquid remaining in the fifth casing 42 (which has enhanced activity) may spill through the ninth through holes 422 to mix with the liquid that have been filtered previously to achieve an effect of enhancing the activity of the filtered liquid.

The present invention may further comprise a cover 5. The cover 5 is arranged to cover and close the second opening 21 of the filtering container 2. Further, the cover 5 may comprise a liftable lid 51.

It will be understood that each of the elements described above, or two or more together may also find a useful application in other types of methods differing from the type described above.

While certain novel features of this invention have been shown and described and are pointed out in the annexed claim, it is not intended to be limited to the details above, since it will be understood that various omissions, modifications, substitutions and changes in the forms and details of the device illustrated and in its operation can be made by those skilled in the art without departing in any way from the spirit of the present invention.

I claim:

1. A compound water filtering jug, comprising:
   a jug, which comprises a first space formed therein, the first space comprising a first opening adjacent to a top of the jug;
   a filtering container, which is arranged in the first space of the jug and adjacent to the first opening, the filtering container comprising a second space formed therein, the second space comprising a second opening adjacent to a top of the filtering container, the filtering container having a bottom in which a first through hole is formed;
   an upper filter, which is arranged in the second space of the filtering container, the upper filter comprising a first casing, the first casing having an outer wall in which a plurality of second through holes is formed and a bottom in which a third through hole is formed, the first casing comprising a first connection section that circumferentially extends along a circumference of the third through hole so that the first connection section is in communication with the third through hole, the first connection section being arranged to insert through the first through hole of the filtering container; and
   a lower filter, which is coupled to and in communication with the upper filter and is received in the first space of the jug, the lower filter comprising a third casing, the third casing having a bottom in which a plurality of fifth through holes is formed and a top that is recessed to form a second connection section and comprising sixth through holes formed in the second connection section, the lower filter being arranged outside and below a bottom of the filtering container, the second connection section being connectable to the first connection section of the upper filter in such a way that the third through hole of the upper filter is in communication with the sixth through holes of the lower filter;
   wherein the third casing receives therein a fourth casing arranged on an inside bottom surface thereof so that the fourth casing has a bottom that communicates with the fifth through holes and a top in which seventh through holes are formed; and
   wherein the lower filter comprises:
   a fifth casing, which is arranged in an interior space of the third casing, the fifth casing having a top in which a plurality of eighth through holes is formed and a side wall in which ninth through holes are formed;
   at least one fourth filtering material, which is arranged between an inside surface of the third casing and the fifth casing in such a way that the fourth filtering material encloses the fifth casing;
   at least one fifth filtering material, which is arranged in an interior space of the fifth casing;
   at least one sixth filtering material, which is arranged in the interior space of the third casing, the sixth filtering material being set at a location that is below the fourth filtering material and above the fourth casing;
   at least one seventh filtering material, which is arranged in an interior space of the fourth casing; and
   at least one eighth filtering material, which is arranged in the interior space of the third casing, the eighth filtering material being received in a space between the sixth filtering material and the fourth casing.

2. The compound water filtering jug according to claim 1, wherein the second opening has a circumferential rim forming a coupling section in such a way that the coupling section is engageable with and thus mountable to a circumferential rim of the first opening of the jug.

3. The compound water filtering jug according to claim 1, wherein the upper filter comprises:
   a second casing, which is received in an interior space of the first casing, the second casing having an outer wall in which a plurality of fourth through holes is formed;
   at least one first filtering material, which is arranged between an inside surface of the first casing and the second casing in such a way that the first filtering material encloses the second casing;
   at least one second filtering material, which is arranged in an interior space of the second casing at a location corresponding to the third through hole;
   at least one third filtering material, which is arranged between an inside bottom surface of the first casing and the second casing and is set at a location corresponding to the third through hole; and
   a sealing ring, which is fit over an outer circumference of the first connection section of the first casing.

4. The compound water filtering jug according to claim 1, wherein the ninth through holes are set at locations adjacent to the eighth through holes and close to the top of the fifth casing.

* * * * *